United States Patent

[11] 3,593,297

[72] Inventor Karl Kadner
Endicott, N.Y.
[21] Appl No. 10,956
[22] Filed Feb. 12, 1970
[45] Patented July 13, 1971
[73] Assignee International Business Machines Corporation
Armonk, N.Y.

[54] DIAGNOSTIC SYSTEM FOR TRAPPING CIRCUITRY

6 Claims, 3 Drawing Figs.

[52] U.S. Cl. .......... 340/172.5
[51] Int. Cl. .......... G06f 11/04
[50] Field of Search .......... 340/172.5, 146.1

[56] References Cited

UNITED STATES PATENTS

| | | | |
|---|---|---|---|
| 3,343,141 | 9/1967 | Hackl | 340/172.5 |
| 3,387,262 | 6/1968 | Ottaway et al. | 340/172.5 |
| 3,387,276 | 6/1968 | Reichow | 340/172.5 |
| 3,405,258 | 10/1968 | Godoy et al. | 340/172.5 |

*Primary Examiner*—Gareth D. Shaw
*Assistant Examiner*—Paul R. Woods
*Attorney*—Edgar H. Kent

ABSTRACT: A diagnostic system locates faults in the trapping circuitry by forcing a branch to a storage address other than that specified in the trap address while preserving the trap address, the address of the forced branch containing successive instructions of a test routine by which the trap address is read out for comparison testing at successive stages until the trap address has been through all the hardware by which it is processed in a normal trap operation.

FIG I

DIAGNOSTIC SYSTEM FOR TRAPPING CIRCUITRY

Figure 1:
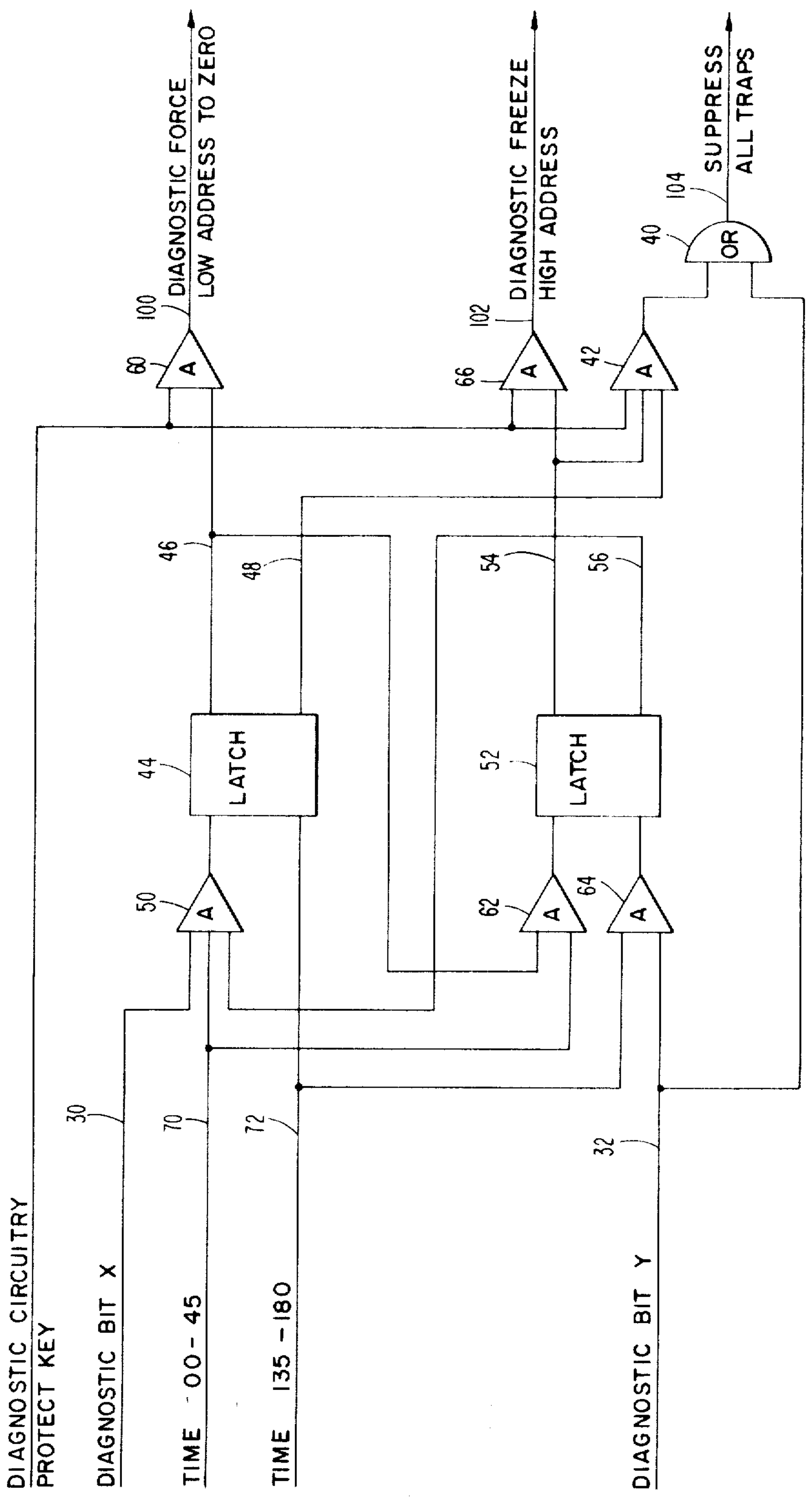

This invention relates to the testing of data-processing apparatus. In particular, it relates to the problem of diagnosing faults in the hardware that generates addresses for forced branches or traps.

In normal operation of a computer the program being executed may be interrupted by requests for traps which depend on factors external to the program being executed, such as the need for machine checks or a signal from the operator of the computer. A trap is a forced branch, in which the computer is forced to leave the program being executed and to go to a specified trap address which is generated according to the request and machine conditions. The forced trap address is usually that of the first word of a series of stored words, the serial execution of which performs the trap routine. Each of the words contains a designation of the address of the next word. The execution of the last word of the routine returns control of the computer to the point at which the program being executed was interrupted by restoring to the address registers the address of the next word of the program which was stored at the outset of the trap operation.

Numerous failures can occur in the trapping hardware. The failure may be in the trapping mechanism, in the generation of the trap address, or in the transfer of the address to the proper register. For example, in the illustrative trapping system hereinafter described, the trap address is generated as 13 address bits plus two parity bits; each address bit generation could fail. The generated address is set into particular registers; each address bit transfer could fail. The generated module address is again gated into a register at a later point in the trap cycle; the gating mechanism could fail. Thus there are numerous possible incorrect addresses to which control may be given due to failures. Such errors are of serious consequence since by accessing the wrong word the trap routine and control of the computer are lost. It is important to be able to diagnose such errors in the forcing hardware, but without losing control of the machine because of the existence of the errors.

It is an object of this invention to provide means for diagnosing failures in the trapping hardware that will ensure that control of the machine is retained. It is also an object of the invention to provide means of diagnosing such failures that will produce exact information to locate the specific fault. It is a further object of the invention to accomplish the foregoing using a minimum of words. In addition, it is an object to provide a diagnostic system that requires a minimum of intervention by the operator, thus saving the operator's time, and thereby provides the diagnostic information at a minimum of expense.

Practice of the present invention requires only slight additions to the hardware utilized in data handling systems which include trapping. Such systems normally include, in addition to control and operand word storage and processing hardware, equipment for signaling a trap request and for generating an address of a trap routine in storage in accordance with the request and machine conditions, a memory address register to which the generated trap address is provided and which transmits this generated trap address to the storage address registers instead of the next address of the program being executed at the time of the request while preserving, until completion of the trap routine, such next address for return thereto when the trap routine is completed.

The logic provided by this invention accomplishes what may be described as "trapping" the trap in order to test for failures in the trapping hardware. According to this logic, a requested trap address is generated and processed through the registers as usual except that the generated trap address is not actually used. Instead, the machine is diverted to another address which is the first address of a test routine for the trapping hardware. This routine reads out for checking purposes the trapping address as originally generated, thereby checking the generating hardware, and similarly such portion of the generated trap address as is further manipulated into and between registers in the normal trapping operation is read out after each manipulation for accuracy check to diagnose any failures in the setting and transfer equipment.

In preferred embodiments, this diagnostic routine is accomplished by a program, preferably provided on an external local memory unit, that generates two diagnostic bits, which together with timing signals, are input to a diagnostic circuit that produces three diagnostic control signals. One signal acts to suppress temporarily the generating of a trap address; the second acts to prevent the setting and resetting of one of the storage address registers, and the third prevents the setting of a new value into a second storage address register. As a result, when the trap address is generated and set into the memory address registers in response to a request from the diagnostic program, these signals prevent the trap address from being set into the storage address registers, which instead retain part of the address of the first control word of the routine throughout the diagnostic routine, while the second part of the address is initially made zero (since the register is reset but not set with a new value) and then allowed to respond normally to the current control word. The current control word at no time depends on the generated trap address, and therefore cannot be in error due to any error in the trap address. The diagnostic routine saves the generated trap address for comparison with an address known to be correct. When the diagnostic routine has been completed, the diagnostic signals are removed and the storage address registers are again allowed to receive addresses from the memory registers.

This system has numerous advantages. Since the diagnostic program may be provided on an external unit, it may be tested before it is used to be sure it is working properly. Only a small number of words is required, since all traps end up in the same address. It provides accurate information about the precise error involved. Finally, in all former methods of diagnosing traps, the operator was obliged to intervene continually to control the diagnostic process manually. Using the logic circuitry of the present invention, the operator need do nothing more than push the Diagnostic button and allow the routine to run without intervention. This results in a saving of time for the personnel checking the machine, and therefore of expense.

Figure 2:
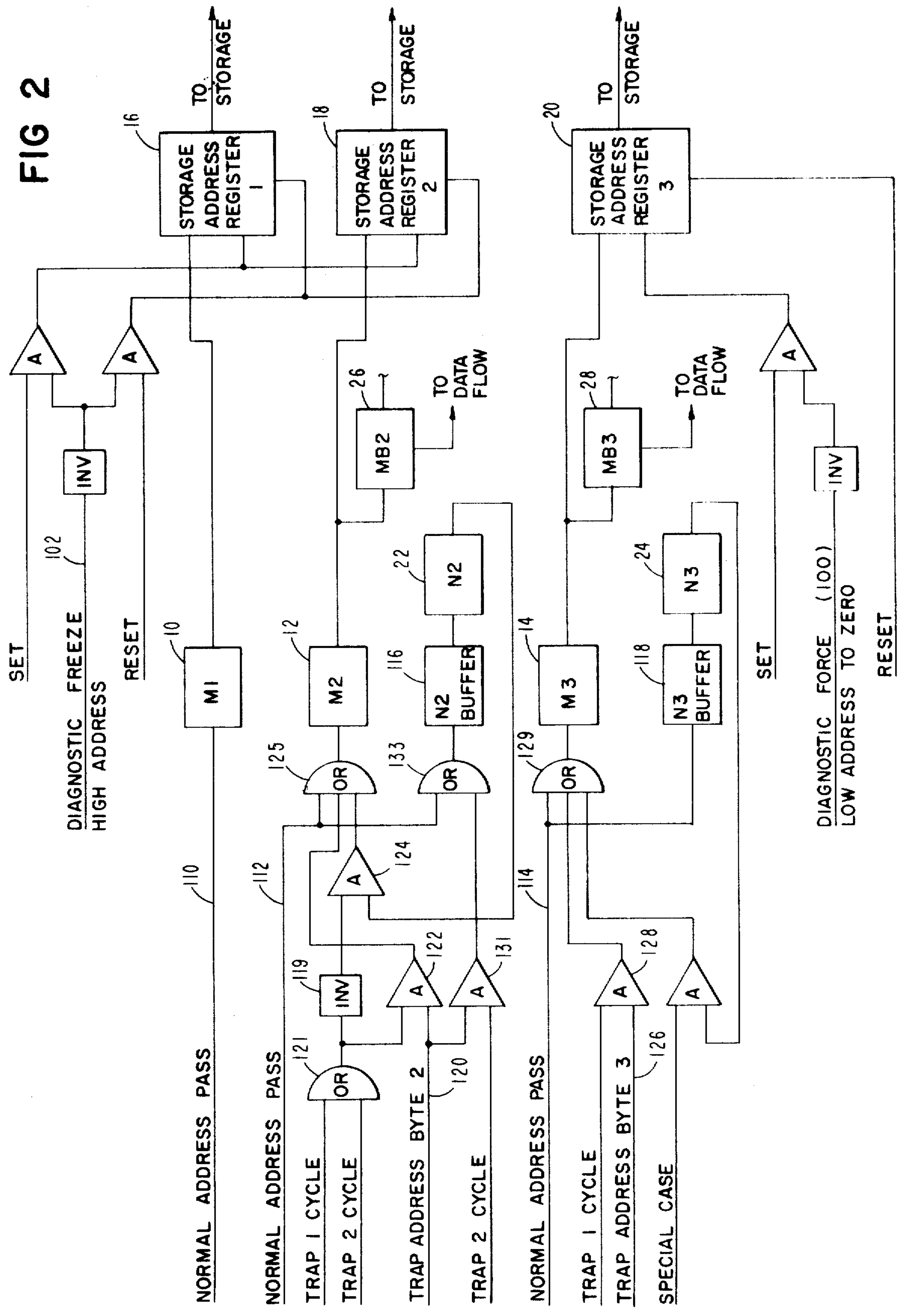
Figure 3:
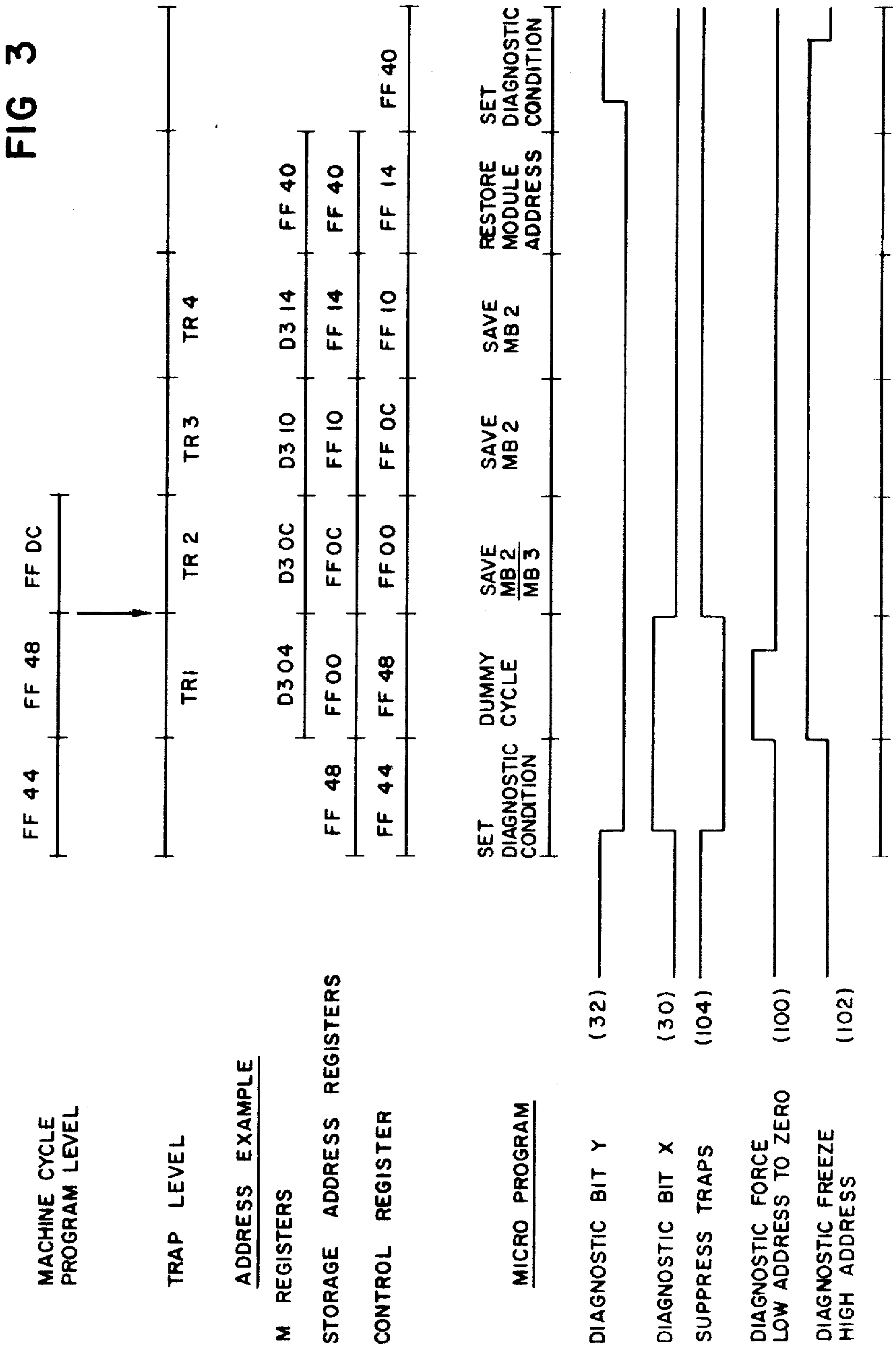

Other objects, features and advantages will appear from the following description of a preferred embodiment of the invention, taken together with the attached drawings thereof, in which FIG. 1 shows a diagram of a circuit to produce the diagnostic signals of the invention, FIG. 2 shows the parts of the computer circuitry involved in transmitting addresses to the storage address register, FIG. 3 is a timing diagram of the diagnostic routine of the invention.

A data processing system with which this invention will ordinarily be useful will have a main storage memory for storing words of bits, the bits individually or collectively representing information such as instructions, data and addresses. The words accessed from the memory are processed as signals representative of the corresponding bit information by various hardware including one or more control registers and decoders which govern the operation of the machine according to the instruction words transmitted thereto and a logical processing unit usually including an arithmetic logical unit for operating on the word bits furnished thereto, as by augmenting or decreasing the collective value thereof, the various actions being coordinated in cycles determined by intervals between cyclic indications of a timing unit. In addition, such a system will include, as is common, trapping mechanism for performing the usual trapping functions described above and hereinafter.

The particular preferred embodiment of the invention herein described is particularly adapted for use with a computer such as is described in application Ser. No. 670,918, filed Sept. 27, 1967, IBM Docket EN966009. An overall schematic view of this computer is shown in FIG. 1 of that application. The present invention deals in particular with Memory Address Register 40 (the M registers), Link Address Register 42 (the N registers), Control Register 9a and Storage 4 and 5 with Storage Address Circuits 46. Registers 40 and 42 are shown in greater detail in FIG. 2n of that application. In preferred embodiments, the diagnostic program is provided on a local read-only disc file, such as utilized in application Ser. No. 743,567, filed July 9, 1968, IBM Docket PO968011, although it may be provided internally in other embodiments.

Referring now to FIG. 2, the memory address registers M include M1 (10), M2 (12) and M3 (14), each of which contains a portion of the address to be accessed. The M registers address the storage unit, which includes storage address registers 16, 18 and 20. When the address is accessed, the word found in it may be either data or a control word; control words are set into the control register (9a of FIG. 1 of said application No. 670,918) where they are used to direct the operation of the computer.

The N registers N2 (22) and N3 (24) are provided as backup registers for control-word addressing.

The portion of the address in register 10 (M1) references the Basic Storage Module, the portion in registers 12 and 22 (M2 and N2 ) references the particular module and the part in registers 14 and 24 (M3 and N3) references the address within the module, specifying one word in the module.

The address in register 22 (N2) is altered only when the current control word specifies a change of module address. In this case, a portion of the control word being executed specifies the address of the next control word, and this address is loaded into M2, M3, N2 and N3. However, if the next control word is in the same module as the control word being executed, N2 is not changed, and its contents are set into M2, while N3 and M3 are set according to the address formed as a result of executing the control word in progress.

In operation in the absence of the diagnostic circuitry, addresses are set into the M and N registers and thence into the Storage Address Registers (SAR) as shown in FIG. 2. When no trap is requested, the address of the Basic Storage Module to be accessed next is provided on the Normal Address Pass line 110 to register 10 (M1), which sends this address to SAR 1 (16). The address of the specific module to be accessed is provided on line 112 to register 12 (M2), which sends it to SAR 2 (18) and to register MB 2 (26), and the address of the word within the module is specified on line 114, set into register 14 (M3) and thence into SAR 3 (20) and MB 3 (28). The module address is also set into N2 (22) by way of the N2 Buffer 116; the word address is set into the N3 register (24) by way of the N3 Buffer (118).

When a trap is requested during the execution of a control word, the low output of Inverter 119 during trap 1 and trap 2 cycles prevents the module address in N2 from being again set into M2 through AND circuit 124. The module address of the trap appears on line 120 and during the first trap cycle, via OR circuit 125, this module address is set into register 12 (M2) by AND circuit 122. It is not set into the N2 register, so that the current next-word address in N2 may be saved for later return. Simultaneously during the trap 1 cycle the trap word address is specified on line 126 and set into register 14 (M3), but is not set into the N3 register, so that the current next-word address in N3 may also be saved.

The trap routine stores the contents of the N registers so that the correct control word sequence can be resumed (by reloading both M and N with the saved address) when the microprogram routine initiated by the trap is completed.

During the trap 2 cycle (still in the absence of the diagnostic program utilized by this invention), the module part of the next trap address is set into both the M2 and N2 registers and thence to the SAR 2 (18) register. The lower part (word) of the trap address is obtained via line 114 from the word being executed and is set into both the M3 and N3 registers and thence to the SAR 3 (20) register. After the trap 2 cycle, the module address in N2 is gated back into M2 by AND circuit 124, and stored in MB2 (26) as well as sent to SAR 2 (18). The lower part of the address is again obtained from the control word being executed.

During the diagnostic program, however, the portion of the address in SAR's 1 and 2 (16 and 18) is compelled by the signal 102 to remain as it is, without responding to set and reset pulses and the new address set by the trap hardware into register 12 (M2); the address in SAR 3 (20) is allowed to be reset (to zero), but signal 100 prevents it from being set with the address portion set into M3 by the trap circuitry. Consequently the address in SAR 3 (20) is zero.

These signals are derived in the following way.

Referring now to FIG. 1, two diagnostic bits X and Y (signals 30 and 32) are generated during the cycle preceding trap 1 cycle in response to the diagnostic microprogram. During trap 1 cycle, these two bits, together with timing signals 70 and 72, generate the three control signals, DIAGNOSTIC FORCE LOW ADDRESS TO ZERO (100), DIAGNOSTIC FREEZE HIGH ADDRESS (102), and SUPPRESS ALL TRAPS (104), by means of the circuit shown in FIG. 1.

This circuit includes the two latches 44 and 52; latch 44 has two outputs, 46 and 48, each of which is off while the other is on. Latch 52 also has two similar outputs 54 and 56 each of which is off while the other is on. Latch 44 output 46 is turned on by the output of AND circuit 50 and remains on until output 48 is turned on by timing signal 72 (135—180). Output 54 of latch 52 is turned on by AND circuit 62 and remains on until output 56 is turned on by AND circuit 64. A Diagnostic Circuitry Protect Key to protect the diagnostic circuit from interference by or with the Central Processing Unit is ANDed to each of the diagnostic signals 100, 102 and 104.

During the cycle preceding trap 1, diagnostic bits X and Y are set in predetermined condition. When bit Y is set, its signal input to the OR circuit 40, causes signal 104 (SUPPRESS ALL TRAPS) to be low. Signal 104 sets an inhibit on all trap request circuitry, so that priority of the trap circuitry test program over machine-requested traps is assured.

During the first quarter of the cycle preceding trap 1, (Set Diagnostic Condition), diagnostic bit Y is on and provides, via OR circuit 40, SUPPRESS ALL TRAPS signal 104. The bit Y signal is turned off at the end of this cycle and since the other terminal of OR circuit 40 is not active, signal 104 terminates during the last quarter of the preceding cycle. The time signal on line 72 (time 135—180) is ANDed with diagnostic bit Y to turn the bottom latch 52 on, conditioning one of the three terminals of AND circuit 50. The signal on line 72 also turns output 48 of latch 44 on.

As bit Y is turned off, diagnostic bit X is turned on and remains on until the end of the trap cycle. During the first quarter cycle of trap 1 AND circuit 50 is conditioned by bit X signal 30, time 00—45 signal 70 and output 56 of latch 52, turning on output 46 of latch 44. This output 46 together with the Diagnostic Circuitry Protect Key signal, via AND circuit 60, provides the DIAGNOSTIC FORCE LOW ADDRESS TO ZERO signal 100. Output 46 and time signal 70 reset latch 52 via AND circuit 62 so that output 54 is on and, together with the diagnostic circuitry circuit key signal and AND circuit 66, provides the DIAGNOSTIC FREEZE HIGH ADDRESS signal 102. Output 54 of latch 52 remains on until the end of the trap test routine when diagnostic bit Y is again supplied to reset the latch and, therefore, the DIAGNOSTIC FREEZE HIGH ADDRESS signal 102 is maintained. Time signal 72 for the last quarter of the trap 1 cycle resets latch 44 turning its output 48 on and its output 46 off, thereby terminating DIAGNOSTIC FORCE LOW ADDRESS TO ZERO signal 100. Output 48 of latch 44 together with output 54 of latch 52 and the diagnostic circuitry protect key signal, via AND circuit 42, reset the SUPPRESS ALL TRAPS signal 104 which now remains on since the absence of diagnostic bit Y signal 32 and termination at the end of trap 1 cycle of diagnostic bit X signal 30 prevent resetting of latches 52 and 44.

Since DIAGNOSTIC FORCE LOW ADDRESS TO ZERO signal 100 is inverted (FIG. 2), it blocks a normally conditioned terminal of an AND circuit, the other terminal of which receives the set signal to SAR 20 so that the set signal is inhibited during the first three quarters of the trap 1 cycle. Consequently, the address in register 20 remains in its reset 00 condition to which it is reset by the reset signal and is prevented from receiving the address in M3 which requires the set signal. Since SAR 20 holds the word address, the word actually accessed from storage during the trap 1 cycle will have a 00 address within the module. Since signal 100 terminates in the trap 1 cycle, SAR 20 is free thereafter to resume the normal process of bring being set with word addresses from M3 by the set pulse during subsequent cycles.

The diagnostic freeze high address signal 102, also inverted, inhibits a normally conditioned terminal of each of two AND circuits, one of which has as its other terminal the set pulse and the other of which, the reset pulse. Since SAR's 16 and 18 therefore receive neither set nor reset pulses, the Basic Module and specific module addresses of the word previously accessed remain frozen in registers 16 and 18 until signal 102 is terminated at the end of the routine.

By means of the foregoing a "trap" takes place to the zero address of the module containing the control word being executed. While the high order portion of the address stays frozen, the low order portion will be set, according to the next address field of the word in that zero address. All the following words of the test routine are located in this same module, although the developed trap address appearing in the M2 and N2 registers may be that of another module, specified by a trap or a module switch function. Thus we "trap" to a fixed location without using the developed (trap or module switch) address. By saving the contents of MB2 and MB3, the address generated by the trap routine is available to be checked.

Referring now to FIG. 3, showing a timing diagram of the diagnostic procedure, the trap routine consists of four cycles TR 1, TR 2, TR 3 and TR 4, which are shown in the row labeled "MICROPROGRAM," together with a preceding "SET DIAGNOSTIC CONDITION" cycle and two following cycles "RESTORE MODULE ADDRESS" and "SET DIAGNOSTIC CONDITION" (for the next test routine). In the "Address Example" rows the Basic Storage Unit address is omitted for simplicity since it is affected in the same manner as the specific module address FF. The second two numbers or letters of the example addresses represent the word address in the specific module. It will be noted that the address in the SAR's is always that of the control word next to be executed since the next word is accessed while the previous word is being executed.

In the cycle before TR 1, while word FF44 in the control register is being executed, the inhibit signal 104 is removed and the machine is allowed to generate a trap address in response to a request from the test program.

During the trap 1 cycle the requested trap address is generated and set into M registers 12 and 14 as it would normally be in response to the trap request. In normal operation this address (D304 in the example of FIG. 3) would be sent to the storage address registers 18 and 20 and used to read out from storage the first word of the trap routine. However, during the diagnostic routine, since failures may occur in the generation of the address or in gating it into the M registers, that address is not used to access the next control word; instead, the first diagnostic signal 102 (FREEZE HIGH ADDRESS) retains the previous module address (FF) in SAR 18, while the second diagnostic signal 100 (FORCE LOW ADDRESS TO ZERO) sets the two lower digits to zero in SAR 20, as previously described.

The address of the next control word is therefore FFOO, as shown in the SAR's 18 and 20 in TR 1. The word found in this address in storage is executed during TR 2 and thus appears in the control register during this cycle. This control word causes readout of the registers MB2 and MB3 (containing the address in M2 and M3) to Data Flow for comparison of their contents with the address known to be correct. If the two values agree, there is no failure in the generating hardware for that particular trap. If the values do not agree, there is a readout of this fact, for example, form a monitor which searches a list of possible failure addresses according to source and prints out the probable source or location fault causing the error.

Referring now to FIG. 2 it will be seen that during the trap 1 cycle the normal transfer of the specific module address from N2 register 22 to M2 register 12 is inhibited during the trap 1 and trap 2 cycles by Trap 1 and Trap 2 Cycle signals to OR circuit 121 which, because of inverter 119, decondition the other normally conditioned terminal of AND circuit 124. The purpose of this inhibit in normal trap operation is so that the specific module address of the next control word of the program interrupted by the trap request and which is normally supplied to the M2 register can be preserved in the N2 registers and read out to storage during the trap 1 cycle (by circuitry not herein shown). The specific module address of the trap is provided to M2 register 12 during TR 1 through OR circuit 125 via Trap Address Byte 2 line 120 and AND Circuit 122, the other terminal of which is conditioned by the Trap 1 Cycle signal via OR circuit 121. Also, during TR 1 the trap word address is set into M3 register 14 over Trap Address Byte 3 line 124, AND circuit 126 the other terminal of which is conditioned via a Trap 1 Cycle line, and OR Circuit 129. Since Normal Address Pass line 1.. is not active a new word address from the control word in process is not set into N3 Buffer register 118 as usual so that the address of the next word of the trap-interrupted program is preserved for readout to storage during TR 1 in normal trap operation (by circuitry not shown herein).

It will therefore be appreciated that in comparison-testing the trap address from registers M2 and M3 during the TR 2 cycle we have tested not only the accuracy of the trap address generating hardware but also that which sets the address into the M2 and M3 registers. However, there remains further trap circuitry hardware to be tested. Referring to FIG. 2 again, it will be seen that on the TR 2 cycle the specific module address is set not only into M2 register 12 but also into N2 Buffer 116 via Trap 2 Cycle lines ANDed with TRAP ADDRESS BYTE 2 line 120 by AND circuit 122 in the case of M2 and by AND circuit 131 and OR circuit 133 in the case of N2 Buffer. The additional circuitry involved, which could fail, is tested during the TR 2 and TR 3 cycles as follows. (The M3 register is restored to its normal state of receiving addresses from the word address field of the control word being processed and therefore its special trap address setting hardware has been fully checked.)

To obtain the word to be executed during the TR 3 cycle, the specific module address (FF) is retained in the storage address register 18 because the FREEZE HIGH ADDRESS diagnostic signal 102 is still active; the FORCE LOW ADDRESS TO ZERO signal 100 has become inactive, however, and the lower digits of the address (OC), specified by the word in FFOO, proceed as usual into M3 register 14 and N3 Buffer register 118 via line 114. Meanwhile the next trap address is developed in M registers 12 and 14 by gating the module address again into M2 (D3 in this case) and adding the lower digits specified by the control word being executed (OC). Since the gating of the module address into or out of M2 may fail, the word at FFOC causes the module address to be read out of MB 2 for checking.

Since, in normal operation, the module address in M2 is transferred to the N2 register via the N2 buffer, and is then transferred back to the M2 register to address the next control word, this transfer process is checked in the diagnostic routine by reading out MB2 again during TR 4. This checks the entire address pass through the N2 buffer and N2 into M2.

Finally, control of the storage address registers 18 and 20 is returned to the M registers 12 and 14 in the following way. During the execution of control word FF 14, the contents of M2 register 12 is altered to agree with the address appearing in the storage address register 18 by transmitting the address FF over line 112 during the cycle following TR 4 (RESTORE MODULE ADDRESS). The FREEZE HIGH ADDRESS signal 102 is then removed, and the storage address registers 18 and 20 are allowed to respond to the M registers 12 and 14 in the usual way.

The diagnostic routine can then continue to test the address-generating hardware for other traps provided by the computer.

I claim:

1. In a data-handling system having control means for directing operation of the system, storage means containing information in the form of words of bits, accessing means, normally responsive to said control means, to locate and retrieve information from said storage means, transfer means to transmit control information words to said control means for execution during said operation, and trapping means, normally responsive to operating conditions of said system or to requests originating externally, for generating a command directing said accessing means to locate and retrieve information at an address specified in said command, a diagnostic system for locating and indicating faults in said trapping means, comprising means to initiate operation of said trapping means to generate a said command, inhibiting means to prevent said accessing means from responding to said command, diagnostic control means for directing said accessing means to locate for transfer to said control means information at an address different from the address specified in said command, and comparison means under the control of said information transferred to said control means to compare said command with the known correct command and to indicate results of said comparison, whereby the information retrieved by said accessing means and transmitted to said current control means for execution is not determined by the operation of said trapping means, but is specified by said diagnostic system, so that erroneous commands generated by said trapping means are available for detecting errors in said trapping means without controlling and misdirecting the operation of said data-handling system.

2. A data-handling system according to claim 1 wherein said diagnostic system also includes means for preventing said trapping means from generating any other command while said diagnostic system is diagnosing a given command.

3. A data-handling system according to claim 1 wherein said accessing means comprises storage address registers for storing bits indicating the module and word address of the next word to be accessed and means for alternately setting said registers with address bits and resetting the same to zero and said inhibiting means includes means for preventing the setting and resetting of said register containing the bits indicating module address and preventing the setting only of said register containing the bits indicating the word address, whereby the different address to which said accessing means is directed by said diagnostic control means is the zero word address of the module address last in said storage address registers.

4. A data-handling system according to claim 3 wherein said trapping means includes a plurality of registers to and in which an address specified in a command generated thereby is differently manipulated in successive cycles of a normal trap operation and said zero address contains the first control word of a plurality thereof forming a test routine in which said address of a said command under test is comparison tested by said comparison means after each different manipulation thereof in and to said registers.

5. A data-handling system according to claim 4 in which each of said control words of said test routine except the last contains bits indicating the word address of the next word of said routine in the same module, said bits of each word being made available for setting into said storage address register for word addresses by its set signal when said word has been transmitted to said control means, said means for preventing the setting of said last-named register prevents the setting thereof only once and said means for preventing the setting and resetting of said storage address register for module addresses prevents the setting and resetting thereof until all the control words of said test routine have been executed.

6. A data-handling system according to claim 5 wherein the last control word of said test routine contains the word address of a control word which causes the control means to alter the module address bits of the trap command under test to conform to the module address bits in the storage address register.